United States Patent
Gill

(10) Patent No.: US 11,806,946 B1
(45) Date of Patent: Nov. 7, 2023

(54) METHOD OF DESIGNING AND PRODUCING CARBON FIBER CONNECTING RODS

(71) Applicant: AWA Forged Composites, LLC, Rolling Hill Estates, CA (US)

(72) Inventor: Bryan Gill, Rancho Palos Verdes, CA (US)

(73) Assignee: AWA FORGED COMPOSITES, LLC, Rolling Hills Estates, CA (US)

( * ) Notice: Subject to any disclaimer, the term of this patent is extended or adjusted under 35 U.S.C. 154(b) by 106 days.

(21) Appl. No.: 16/890,782

(22) Filed: Jun. 2, 2020

Related U.S. Application Data

(63) Continuation-in-part of application No. 16/041,464, filed on Jul. 20, 2018.

(60) Provisional application No. 62/541,535, filed on Aug. 4, 2017, provisional application No. 62/535,002, filed on Jul. 20, 2017, provisional application No. 62/534,956, filed on Jul. 20, 2017.

(51) Int. Cl.
| | |
|---|---|
| *B29C 70/34* | (2006.01) |
| *B29C 33/38* | (2006.01) |
| *B23B 35/00* | (2006.01) |
| *B29C 70/54* | (2006.01) |
| *B29L 31/06* | (2006.01) |
| *B29K 307/04* | (2006.01) |
| *B29K 63/00* | (2006.01) |

(52) U.S. Cl.
CPC ............ *B29C 70/345* (2013.01); *B23B 35/00* (2013.01); *B29C 33/3835* (2013.01); *B29C 33/3842* (2013.01); *B29C 70/545* (2013.01); *B23P 2700/04* (2013.01); *B29K 2063/00* (2013.01); *B29K 2307/04* (2013.01); *B29L 2031/06* (2013.01)

(58) Field of Classification Search
CPC ...... B29C 70/345; B29C 70/545; B23B 35/00; B29C 33/3835; B29C 33/3842; B29K 2063/00; B29L 2031/06
See application file for complete search history.

(56) References Cited

U.S. PATENT DOCUMENTS

| | | | |
|---|---|---|---|
| 4,017,348 A * | 4/1977 | Shumaker | B29C 70/462 301/6.2 |
| 4,198,879 A | 4/1980 | Hornak et al. | |
| 4,458,555 A | 7/1984 | Holtzberg et al. | |
| 2005/0153125 A1* | 7/2005 | Shiokawa et al. | C04B 41/52 427/248.1 |
| 2011/0097213 A1 | 4/2011 | Peretti et al. | |
| 2015/0130261 A1* | 5/2015 | Warren | B29C 70/462 264/118 |
| 2015/0292550 A1 | 10/2015 | Streckel | |
| 2018/0274583 A1 | 9/2018 | Yamashita et al. | |

FOREIGN PATENT DOCUMENTS

CN      104403344 A      3/2015

OTHER PUBLICATIONS

W. Kowbel, V. Chellapa, and J.C. Withers, "Applications of Netshape Molded Carbon-Carbon Composites in IC Engines". Journal of Advanced Materials volume 27 No. 4 (Year 1996).

* cited by examiner

*Primary Examiner* — Nirvana Deonauth
(74) *Attorney, Agent, or Firm* — Douglas B Teaney

(57) ABSTRACT

Methods of designing and producing a connecting rod using carbon fiber reinforced epoxy molding compound composite material are provided, such that the method allows connecting rod designer to machine several different connecting rod designs, lengths, and beams. The material is molded into a near-net shape. After molding, the blank is machined into the final shape of a connecting rod and the material is sealed.

9 Claims, 18 Drawing Sheets

METHOD OF DESIGNING AND PRODUCING CARBON FIBER CONNECTING RODS

RELATED APPLICATIONS

This application is a continuation in part of U.S. Utility Application Serial No. 16/041,464 filed Jul. 20, 2018 which claims benefit of U.S. Provisional Application Serial Nos. 62/541,535 filed Aug. 4, 2017, U.S. Provisional Application Serial Nos. 62/534,956 and 62/535,002 filed Jul. 20, 2017, each of these applications is hereby incorporated by reference herein in its entirety.

FIELD OF THE INVENTION

The present application relates to industrial, marine, small aircraft, diesel, or any other internal combustion transportation type connecting rod manufacturing and methods of designing and producing composite connecting rods. More specifically, the present invention pertains to a new method of designing and producing a composite connecting rod using compression molded, carbon fiber reinforced epoxy molding compound composite material that is machinable after being formed, and a design process that allows many different designs to be machined from a shaped mold of composite material.

BACKGROUND

Automotive type connecting rods are structures that join pistons with crank. High performance connecting rods are lightweight and high strength structures that are specifically designed to increase power sufficiently for competition or rigorous use. High performance and exotic engines are not the only engines which benefit from the connecting rods. Connecting rods are replaced for increased performance and better fuel economy because lightweight and high strength connecting rods lead to a smaller rotational inertia, and in turn, a smaller amount of energy required for an engine to accelerate. At a constant speed, engines spend energy to move the connecting rods up and down. Therefore, by decreasing the weight of the connecting rods reduces the energy spent by the engine in this transient response cycling.

Increasing power of the engine leads to increased stresses which are placed on the various parts of the engine, including increased stresses placed on the connecting rods and bearings. Advancements in engine technology have resulted in a demand for connecting rods which are both lighter and stronger than previous generations of connecting rods.

Demand for improved connecting rod strength and lightness is more important in the field of auto racing, including for gas, alcohol, diesel, and nitro engines which are used in various forms of motor racing. These engines are subjected to incredible loads, especially in ultra-high combustion pressure loads. The loads are compressive in nature, and whenever the yield strength of the connecting rods is exceeded, the rods are damaged or destroyed. Typical damage which results from these stresses includes bending of the connecting rod beam (the portion of the connecting rod extending between the pin end and the fork), elongation of the wrist pin bore, and deformation of the bearing housing bore, particularly in the cap of the connecting rod.

The materials which are used to make high performance connecting rods are almost exclusively high-tech aluminum alloys, which are generally characterized by relatively light weight and the requisite high degree of material strength. Aluminum alloys have been used for high performance engines such as those used in drag racing for thirty years, with the first alloy used being 2014-T6 aluminum alloy, which has a compressive yield strength of 58 ksi. More recently, 7075-T6 aluminum alloy has been used, which has a substantially higher compressive yield strength of 72 ksi. Neither of these alloys currently possesses sufficient compressive yield strength to withstand the compression loads of racing engine technology. In addition, the manufacture of high-performance aluminum connecting rods from aluminum material must be of a nature which enhances, and in no way reduces, the material strength characteristics of the aluminum material.

Therefore, there is a need in the art for improvements particularly to existing aluminum connecting rod designs and manufacturing methods. The present invention substantially diverges in design elements and method steps from the prior art, and consequently substantially fulfills these needs.

SUMMARY

In view of the foregoing disadvantages inherent in the known types of aluminum connecting rods present, embodiments of the present invention provide a new design and manufacturing method which are utilized for producing a composite connecting rod that reduces cost and wasted material to produce a lightweight, high performance connecting rod for competition or transportation use.

Embodiments of the present invention are directed to new methods of manufacturing and designing high performance connecting rods, which increase performance thereof with a high degree of increased power and economy and possess sufficient compressive yield strength to withstand the compression loads of racing or other engine technologies.

An aspect of the invention herein provides a method of designing and producing a composite connecting rod having one or more connecting rod designs, the method including: overlaying at least one of the connecting rod designs to obtain a single connecting rod blank design; forming a tooling cavity mold of the connecting rod blank design and compression molding a connecting rod blank using the tooling mold; and machining the connecting rod blank into at least one of the connecting rod designs thereby obtaining the composite connecting rod.

In an embodiment of the method, the composite includes a carbon fiber reinforced epoxy molding compound composite material. In an embodiment of the method, the connecting rod designs further include determining diameter, length, and beam type of the connecting rod designs prior to overlaying the connecting rod designs. In an embodiment of the method, compression molding the connecting rod blank further includes: heating the composite material; communicating after heating the composite material into the mold; compressing material in the mold using a press; and removing the material after cooling. In an embodiment of the method, compressing further includes laying a unidirectional fiber skeleton. In an alternative embodiment of the method, compressing does not include laying a unidirectional fiber skeleton.

An embodiment of the method further includes preparing a complete tooling assembly prior to overlaying the connecting rod designs. In an embodiment of the method, preparing the complete tooling assembly further includes: making a universal base tool for designing and producing one or more connecting rod blank; designing specific parts including a cavity piece, core piece, and at least one ejector pin to mold the connecting rod blank; manufacturing the specific parts; and attaching the specific parts to the universal base tool to obtain the complete tooling assembly. In an embodiment of the method, forming the tooling cavity further includes constructing the tooling cavity with a small end boss protrusion, a big end boss protrusion and a side protrusion. In an embodiment of the method, laying the unidirectional fiber skeleton further includes: designing an apparatus for matching the small end boss protrusion, the big end boss protrusion and the side protrusion of the tooling cavity; wrapping a carbon fiber towpreg around the big end protrusion of the apparatus, laying the towpreg around the small end boss protrusion thereby wrapping the small end boss protrusion; draping the towpreg around the small end boss protrusion and the big end boss protrusion; arranging the towpreg around the small end boss protrusion, the big end boss protrusion, and the side protrusion; and placing the towpreg in a crisscross arrangement around the small end boss protrusion, the big end boss protrusion, and the side protrusion thereby obtaining the unidirectional fiber skeleton.

In an embodiment of the method, compression molding the connecting rod blank further includes at least one of: laying at least one first sheet matrix composite plie on the tooling cavity; laying the unidirectional fiber skeleton on the first plie; laying at least one second sheet matrix composite plie on the unidirectional fiber skeleton; and compression molding the first plie, the unidirectional fiber skeleton, and the second plie in the tooling assembly to obtain the connecting rod blank.

In an embodiment of the method, the connecting rod blank includes a flange located around perimeter of the blank, a pinch point, a bolt register, and a bearing tang. In an embodiment of the methods, machining the connecting rod blank further includes at least one of: machining a flange around perimeter of the connecting rod blank; machining a pinch point of the connecting rod blank; cutting bolt registers of the connecting rod blank; cutting bearing tangs of the connecting rod blank; boring a small end hole to over final tolerance for DLC anti-friction coating or a bushing on the connecting rod blank; cutting a pin end oil hole on the connecting rod blank; putting bolts and nuts on the rod blank and tightening bolts to final torque; and boring a big end hole on the rod blank under tension to final tolerance.

In an embodiment of the method, compression molding the connecting rod blank further includes at least one of: machining a big-end boss to final tolerance; machining a small-end boss to slightly greater than final tolerance; cutting at least one bolt register; cutting bearing tangs to a specific application; plasma coating a small-end hole; and machining the small-end boss to final tolerance.

An embodiment of the method further includes after machining the small-end boss to final tolerance, cutting a pin-end oil hole. An embodiment of the method further includes after machining, impregnating the connecting rod blank with an impregnating liquid. An embodiment of the method further includes after machining, impregnating the connecting rod blank with impregnating liquid containing sodium silicate.

In an embodiment of the method, impregnating the connecting rod blank further includes: placing the connecting rod blank into an autoclave; applying vacuum to the autoclave and subjecting the connecting rod blank to negative autoclave pressure; heating the impregnating liquid containing sodium silicate to obtain a heated impregnating solution; introducing the heated impregnating solution into the autoclave; submerging the connecting rod blank in the heated impregnating solution and increasing the autoclave pressure from negative pressure to positive pressure; maintaining positive pressure in the autoclave for at least about one day from at least about 50 lbs. per square inch to at about 85 lbs. per square inch; removing the connecting rod blank from the autoclave and washing the connecting rod blank in cold water; and drying the connecting rod blank in a low-temperature oven for at least about one hour.

In an embodiment of the method, maintaining positive pressure further includes maintaining positive pressure for at least about one hour, at least about 2 hours, at least about 4 hours, at least about 6 hours, at least about 8 hours, at least about 10 hours, at least about 12 hours, at least about 14 hours, at least about 16 hours, at least about 20 hours, at least about 22 hours, at least about one day, at least about two days, at least about three days, at least about four days, or at least about five days.

In an embodiment of the method, maintaining positive pressure further includes maintaining pressure from at least about 40 lbs. per square inch to at about 100 lbs. per square inch. In an embodiment of the method, drying the connecting rod blank further includes drying the blank in a low-temperature oven from at least about 10 minutes to at least about one day.

An aspect of the invention herein provides a composite material connecting rod blank including a carbon fiber reinforced epoxy molding compound.

In an embodiment of the connecting rod blank, the blank is impregnated with sodium silicate. An embodiment of the connecting rod blank further includes at least one structure selected from: a big-end boss, a small-end boss, at least one bolt register, bearing tangs, a small-end hole, and a pin-end hole. In an embodiment of the connecting rod blank, the carbon fiber is a unidirectional fiber skeleton.

In an embodiment of the connecting rod blank, the carbon fiber is thermally set in a loop. In an embodiment of the connecting rod blank, the carbon fiber reinforced epoxy molding compound is a sheet. In an embodiment of the connecting rod blank, the compound is lytex. In an embodiment of the connecting rod blank, the compound is Quantum Composites AMC 8593 HT.

In an embodiment of the connecting rod blank, the blank withstands a power of at least about 5000 hp, at least about 6000 hp, at least about 7000 hp, at least about 8000 hp, at least about 9000 hp, at least about 10,000 hp, at least about 11,000 hp, at least about 12,000 hp, at least about 13,000 hp, at least about 14,000 hp, or at least about 15,000 hp. In an embodiment of the method, the carbon fiber reinforced epoxy molding compound is a thermoplastic composite sheet molding compound.

An aspect of the invention herein provides a method for compression molding of a thermoplastic composite sheet molding compound (SMC), the method including: clamping and tensioning an organ sheet of the thermoplastic composite in a blank holder; heating the thermoplastic composite to a desired molding temperature; transferring the thermoplastic composite to a tooling press; forming the thermoplastic composite into a shape of a mold to obtain a first laminate; obtaining a second laminate and bonding the first laminate to the second laminate; repeating obtaining laminate and bonding laminate to a preferred thickness to obtain the thermoplastic composite SMC; and cooling and removing the SMC from the tooling press. An embodiment of the method further includes maintaining a tooling press temperature greater than a melting point of the thermoplastic composite.

An aspect of the invention herein provides a composite material connecting rod that includes a carbon fiber reinforced epoxy molding compound. The connecting rod has a size and shape for an automotive vehicle which is selected from: a motorcycle, a sedan, a pickup truck, a sports utility vehicle, a van, a truck, an airplane, a dirt bike, and a racing car.

An aspect of the invention herein provides a method for designing and producing a composite carbon fiber reinforced epoxy molding compound connecting rod, the method including: overlaying at least one of a connecting rod design to obtain a connecting rod blank design; making a universal base tool for designing and producing a connecting rod blank of the connecting rod blank design; designing specific parts including a cavity piece comprising small end boss protrusion, a big end boss protrusion and a side protrusion; a core piece; and at least one ejector pin to mold the connecting rod blank; designing an apparatus that matches the small end boss protrusion, the big end boss protrusion and the side protrusion of the cavity piece; manufacturing the specific parts and the apparatus; attaching the specific parts and the apparatus to the universal base tool to obtain a complete tooling assembly; laying at least one first sheet matrix composite plie on the cavity piece; wrapping a carbon fiber towpreg in a crisscross arrangement around the small end boss protrusion, the big end boss protrusion, and the side protrusion to obtain a unidirectional fiber skeleton; laying the unidirectional fiber skeleton on the first plie; laying at least one second sheet matrix composite plie on the unidirectional fiber skeleton; compression molding the first plie, the unidirectional fiber skeleton, and the second plie in the tooling assembly to obtain the connecting rod blank; machining the connecting rod blank into at least one of the connecting rod designs to obtain the composite carbon fiber reinforced epoxy molding compound connecting rod; and impregnating the composite connecting rod with a sodium silicate solution.

In an embodiment of the method, machining the connecting rod blank further includes at least one of: machining a flange around perimeter of the connecting rod blank; machining a pinch point of the connecting rod blank; cutting bolt registers of the connecting rod blank; cutting bearing tangs of the connecting rod blank; boring a small end hole to over final tolerance for DLC anti-friction coating or a bushing on the connecting rod blank; cutting a pin end oil hole on the connecting rod blank; putting bolts and nuts on the rod blank and tightening bolts to final torque; and boring a big end hole on the rod blank under tension to final tolerance.

In an embodiment of the method, impregnating the connecting rod blank further includes: placing the connecting rod blank into an autoclave; applying vacuum to the autoclave and subjecting the connecting rod blank to negative autoclave pressure; heating the sodium silicate solution to obtain a heated impregnating solution; introducing the heated impregnating solution into the autoclave; submerging the connecting rod blank in the heated impregnating solution and increasing the autoclave pressure from negative pressure to positive pressure; maintaining positive pressure in the autoclave for at least about one day from at least about 50 lbs. per square inch to at about 85 lbs. per square inch; removing the connecting rod blank from the autoclave and washing the connecting rod blank in cold water; and drying the connecting rod blank in a low-temperature oven for at least about one hour.

An objective of the present invention provides a new method of designing and manufacturing composite connecting rods, in which the method includes processing carbon fiber reinforced epoxy molding compound composite material into a connecting rod blank that is machinable to the end design of the given connecting rod.

Another objective of the present invention provides a design method for creating a composite connecting rod in which one mold is utilized to create a connecting rod blank that accommodates a plurality of different connecting rod designs, so that the final design is machined from the singly designed blank.

Another objective of the present invention provides a design method of composite connecting rods that increases efficiency to the end consumer, and retains the primary advantages associated with composite connecting rods (light weight, high stiffness, high strength, greater fatigue life, etc.).

Other objectives, features, and advantages of the present invention will become apparent from the following detailed description taken in conjunction with the accompanying drawings.

DETAILED DESCRIPTION

The present application provides to a new method of designing and producing composite connecting rods in which the material is non-directional and conforms to the shape of the mold. The carbon fiber reinforced epoxy molding compound composite is supported within a resin matrix and is in random directions to produce a quasi-isotropic material system that is molded around an embedded unidirectional fiber skeleton for additional strength. Using the carbon fiber reinforced epoxy molding compound composite material benefits the connecting rod design process since this material system is machinable after being formed. Further provided is the design of the connecting rod blank that is adaptable to different diameters and beam types with a minimal loss of material during the machining process.

After the blank is molded, it is machined in the following steps. The flange around the perimeter of the rod and the pinch area between the beam and cap is machined off. The bolt registers are drilled and the bearing tangs are cut. The small end hole is bored to a near final tolerance for preparation for the DLC anti-friction coating or the use of a bushing, and the pin oil hole is cut. Then, the bolts and nuts are put onto the rod and tightened to final torque and the big end boss is bored to final tolerance, to create a concentric hole when the rod is under tension. The connecting rods are then placed into a pressure chamber and sealed with a sodium silicate process to mitigate fluid intake.

Compression Molding

The compression molding process is a precise and rapid process for producing high-quality composite parts in a range of volumes. Compression molding is used to produce high-performance thermoplastic composite connecting rods as in the methods of the invention provided herein. In the present invention, the carbon fiber reinforced epoxy molding compound is a thermoplastic composite sheet molding compound.

Figure 4:
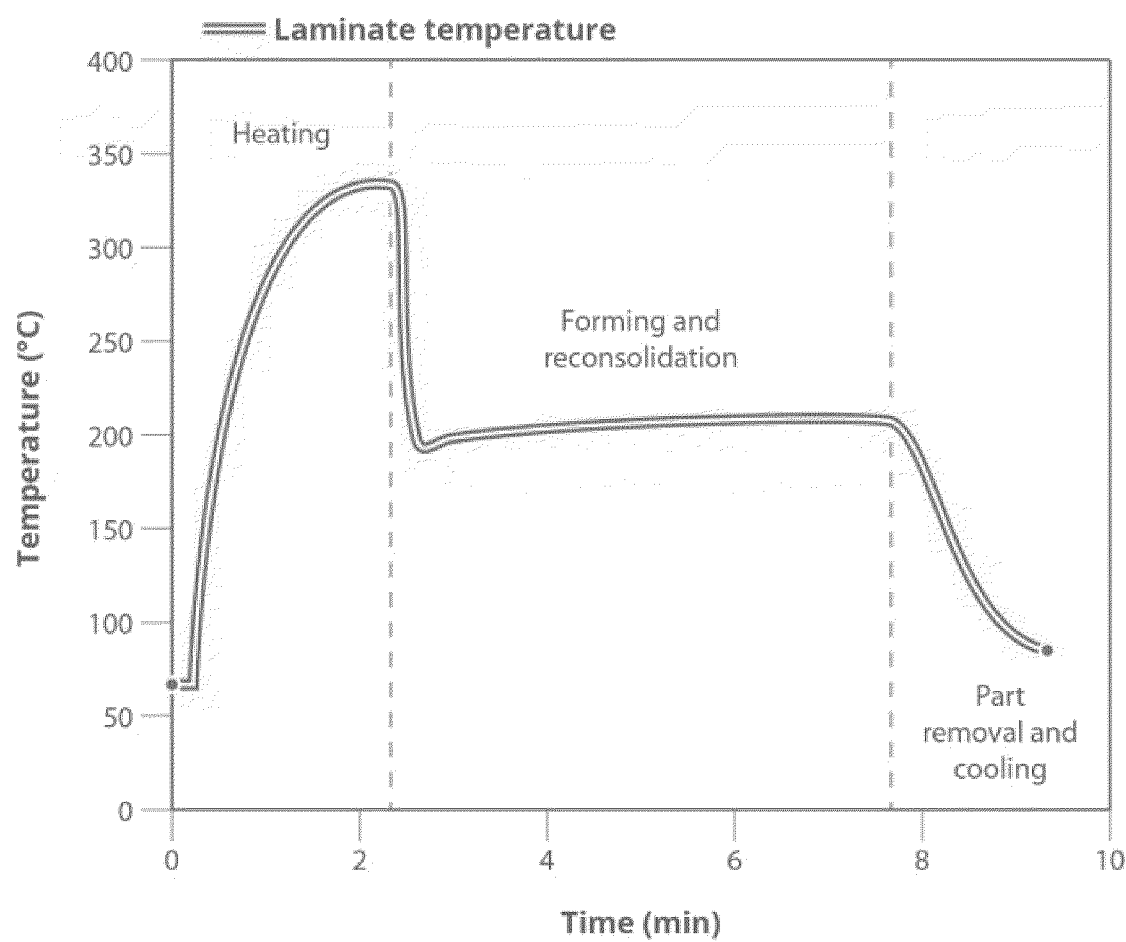
FIG. 4 is a line graph of laminate temperature profile for a thermoplastic composite laminate during compression molding.

For pre-heating, an organ sheet is usually clamped and tensioned in a blank holder. During this stage, the sheet molding compound (SMC) tends to sag significantly as the temperature increases above the melting point of the thermoplastic matrix. The sagging is generally difficult to eliminate, as tooling systems can apply tension only on the edges of the sheet molding compound, thus leaving most of its surface unsupported. Excessive sagging can also cause material handling problems, in which the sheet molding compound snags on the tooling when transferring from pre-heating to forming. In extreme cases, sagging can cause the sheet molding compound to fall off the tooling. Depending upon the heating method used, sagging can result in temperature variations between the top and bottom surfaces of the sheet molding compound. The entire process is completed within 10 minutes. See FIG. 4. It is therefore important to be aware of this, and to ensure that the desired molding temperature is reached across the whole laminate before transferring to the press. For thicker laminates, it is important to remember that there may be a significant delay before a uniform through-thickness temperature is reached.

Once the sheet molding compound has reached the desired temperature, it is transferred to the press and formed into the shape of the mold. During this stage, the temperature of the laminate depends on the temperature at which the tooling is set. From the point of view of minimizing cycle times, the ideal situation is to fix the tool at a constant temperature, somewhere between the glass transition temperature (Tg) and melting temperature (Tm) of the polymer matrix. This temperature range allows the matrix polymer to flow when pressure is applied, but also allows the part to be removed "hot" and left to cool through free surface convection. For some materials and/or more complex parts, however, having the tool temperature set below Tm does not permit sufficient flow of the polymer matrix, resulting in poorly formed features, defects and voids. In these instances, it is necessary to increase tooling temperature in order to reduce matrix viscosity, and thereby improve flowability. The drawback of the method is that the part must then be allowed to cool before being removed from the tool. Cycling the tool temperature in this way can lead to significant increases in cycle time.

Temperature Effects on Forming

In contrast to metals, which are shaped through plastic deformation – a process which is well understood and can be easily characterized and modelled – the shaping of continuous fiber reinforced composites is more complex, driven mainly by two mechanisms: inter-ply shear and intra-ply shear.

Inter-ply shear refers to the movement of individual plies relative to each other within a laminate. It is the main deformation mechanism which allows the formation of bends or single curved shapes. If the layers cannot slide over each other, buckling defects occur. The extent to which inter-ply shear occurs depends upon a number of factors, such as the viscosity of the matrix polymer during the forming process. Lower resin viscosities result in reduced resistance to inter-ply shear. Therefore, to avoid fiber buckling defects, the tool temperature and/or the sheet molding compound temperature is increased. However, if increasing these set temperatures is not an option because, for example, it would lead to excess sagging or unacceptable cycle times, an alternative option is to minimize any temperature decreases which occur during the process, for example by reducing the transfer time between pre-heating and forming operations or by increasing processing speed. However, if processing speed is increased, the applied shear rate also increases. Further, if the applied shear rate is increased the shear stress required in order to allow plies to move over each other also increases due to the viscoelastic behavior of thermoplastic composites. Accordingly, increasing processing speed results in more buckling.

Figure 5:
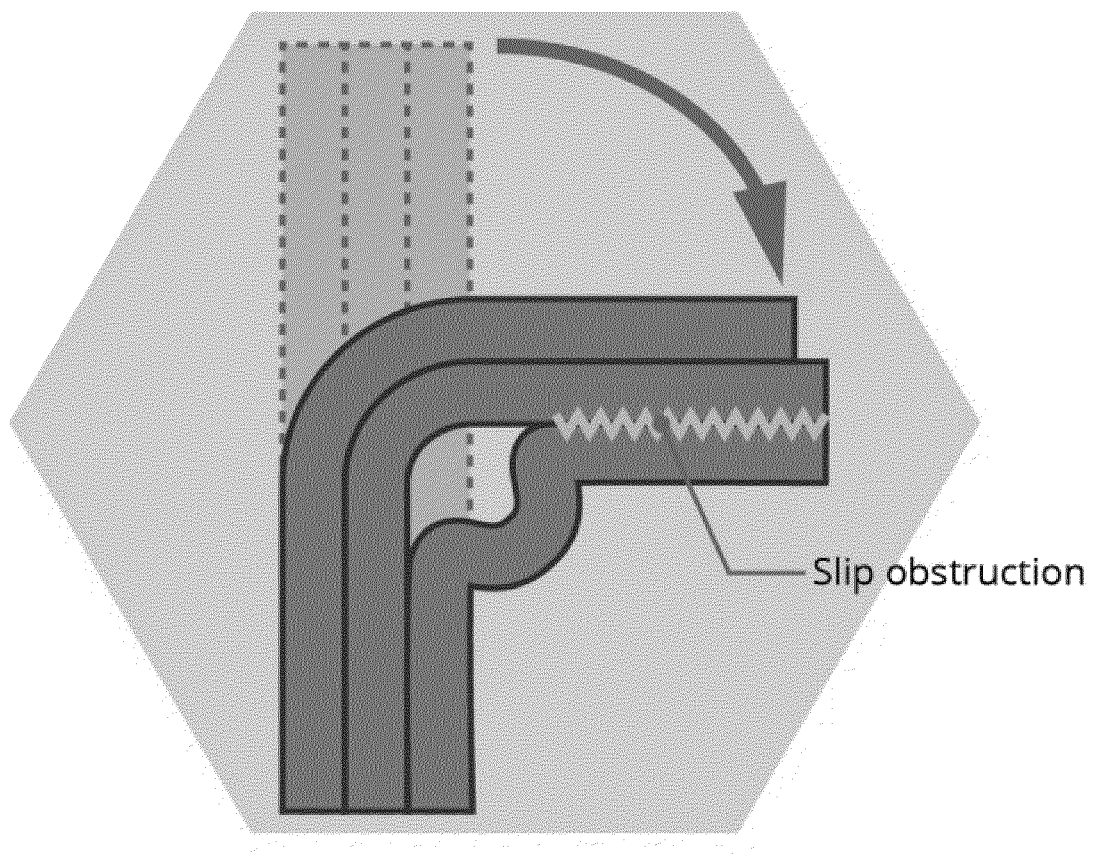
FIG. 5 is a schematic drawing showing slip obstruction and fiber buckling of a thermoplastic composite laminate caused by insufficient inter-ply slippage.

Further, fire orientation also influences the ease with which neighboring plies can slip over each other. At interfaces where adjacent plies have the same fiber orientation, fibers may "migrate" from one side of the interface to the other, thereby increasing the resistance to inter-ply slippage. See FIG. 5.

Figure 6:
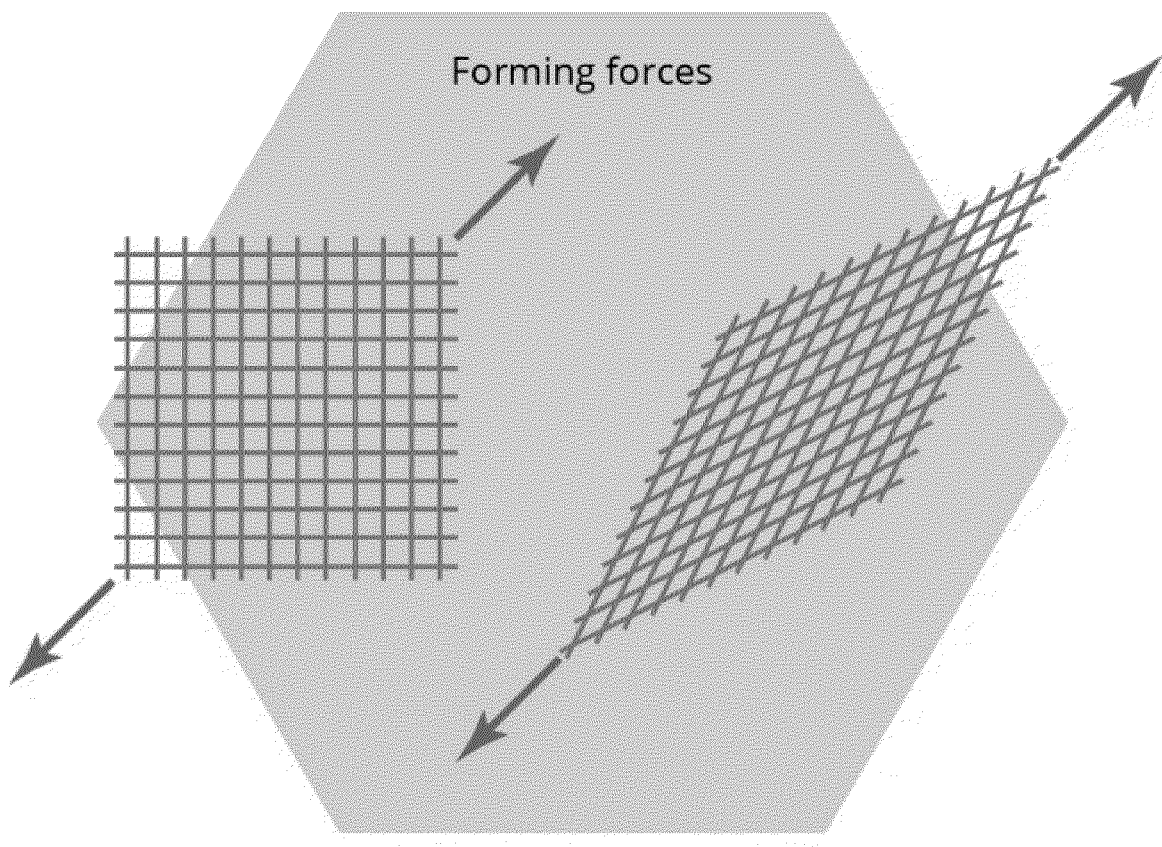
FIG. 6 is a schematic drawing showing a number of factors that lead to wrinkling of a thermoplastic composite laminate.

Intra-ply shear is a deformation mechanism which is one of the most important aspects when designing press forming processes for complex shaped parts. The extent at which fibers can rotate in a fabric layer is limited. In case the fibers can't rotate any further, they wrinkle and wrinkling is one of the most common defects in forming composite parts into 3-dimensional shapes. See FIG. 6.

There are several different factors that lead to wrinkling such as laminate lay-up, fiber reinforcement, laminate clamping method, shear rate, and laminate temperature. Laminate lay-up is common in quasi-isotropic laminates which tend to wrinkle more easily due to shear constraints imposed by plies oriented in multiple directions. Fiber reinforcement is common in unidirectional plies which typically have much lower shear capability than woven fabrics. Therefore, shaping a unidirectional laminate into a complex geometry is more difficult than a laminate comprising woven fabric layers.

Grips and/or springs for tooling are generally useful at keeping the laminate tensioned while being formed, which often mitigates wrinkling. However, the position at which grips and/or springs are located strongly affects the laminate forming behavior as well, thereby changing their position leads to a defective part.

Shear rate like inter-ply slip is related to the forming speed. For example, higher shear rates tend to result in increased intra-ply shear resistance. Laminate temperature greatly influences resin viscosity and maximum shear deformation.

Dedicated process simulation packages aim to predict whether wrinkling will occur. However, as there are very few materials for which the intra-ply shear behavior at processing temperatures is fully characterized, these simulation packages can often rely on the user being able to generate and input their own data.

Therefore, it is not straightforward to generate the material property data required by simulation packages. Rather, hands-on process optimization experiments often remain the most suitable means of studying the influence of multiple process parameters on part quality.

Product prototypes are produced from different material configurations, using differing forming speeds, mold temperatures, blank clamping methods and tooling arrangements (e.g. metal-metal or rubber-metal). Visual and microscopical defects are then evaluated and decisions are made on the most effective part lay-up and process design.

However, controlling the temperature of the sheet molding compound during processing is important so the temperature must be accurately measured throughout the compression molding process. The temperature is measured by using multiple thermocouples, strategically placed across the starting sheet molding compound. For thicker sections, it is advantageous to produce sheet molding compounds with thermocouples embedded mid-plane.

In methods of the embodiment of the invention herein, the thickness of structural components is tailored to reduce weight of the sheet molding compound. Therefore, highly loaded regions require thicker sections, and in lightly loaded regions the thickness is reduced.

Although not traditionally associated with compression molding, variable thickness components of this type are achieved by employing a multiple step forming technique. Using this technique, a part is built up in stages in the same tool; at each stage a laminate is formed and bonded to the previous one. In order to form and bond the laminate to a previous laminate, the tool temperature has to be set at a point greater than the melting point of the polymer, otherwise the new layer would fail to bond to the previous one. Further, in the last forming step, the part must be cooled under pressure before it is removed from the tool.

This method of forming sheet molding compound is used to manufacture quasi-isotropic layups into complex shapes and mitigate wrinkling defects. Instead of forming such a layup in one step, multiple thinner laminates or layers are formed in multiple steps. An important aspect of this method is to use rubber tooling, to provide uniform pressure across the part surface. The post cure part is observed to have material properties, in tensile Modulus ranging from 30,000-40,000 (MPa) and a Flexural Modulus (28,000(MPa) and Flexural Stress (break) 78,000 (Mpa)

The present invention in various embodiments provides a new design and manufacturing method of composite connecting rods using carbon fiber reinforced epoxy molding compound composite material, such that the design reduces material waste, reduces engineering design expense for each connecting rod design, and reduces the cost of composite connecting rods to consumers. Various molds are used to accommodate a plurality of connecting rod designs, lengths, diameters, and beam types, so that the resulting connecting rod blank from the single mold process is machined to a specific size and shape for the desired connecting rod. The resulting connecting rod then joins the piston with the crank to produce a high-performance assembly at a reduced cost and weight compared to traditional methods of aluminum, titanium and steel in the market.

Reference is made herein to the attached drawings. Like reference numerals are used throughout the drawings to depict like or similar elements of the present methods. For the purposes of presenting a brief and clear description of the present invention, exemplary embodiments are discussed as used for creating a composite connecting rod blank using carbon fiber reinforced epoxy molding compound composite material and a design process that minimizes waste and costs. The figures are intended for representative purposes only and should not be considered to be limiting in any respect.

The present invention provides a new design and manufacturing methods for connecting rods using composite material, such that the production of the connecting rod involves a forming process and the design method allows for multiple different connecting rod designs to be incorporated into a single manufacturing process. The design method reduces material waste and costs of the connecting rod for the end consumer, while maintaining the benefits offered by composite connecting rods. Specifically, carbon fiber reinforced epoxy molding compound composite is used to create the connecting rod, such that the carbon fiber reinforced epoxy molding compound composite is placed into a mold, compression molded into a formed shape with or without a unidirectional fiber skeleton, and then machined into a final connecting rod design. The use of carbon fiber reinforced epoxy molding compound composite and a forming process allows designers and fabricators to machine the final design from a larger connecting rod blank, which allows one connecting rod blank to be utilized for multiple connecting rod designs without individually engineering each connecting rod and creating a specific mold for each design. This eliminates the traditional aluminum forging process and replaces it with a carbon fiber-based material.

The present invention in various embodiments provides methods for creating a composite connecting rod blank of carbon fiber, rather than forging aluminum. The present invention provides methods of utilizing a carbon fiber reinforced epoxy molding compound composite compression molding process and a design process similar to aluminum connecting rod fabrication but with carbon fiber-based material. This leads to greater RPM optimization. A shaped connecting rod (tooling cavity) blank is created from the combination of several different connecting rod designs, which is then machined to the exact connecting rod design chosen by the end user. Connecting rod designs are overlaid onto one another in a design space to establish the shape of the connecting rod blank to be created from the carbon fiber reinforced epoxy molding compound composite material in a mold. The process accommodates connecting rods of different diameter, length, beam type and design, such that the final product connects the piston to the crank.

Figure 1:
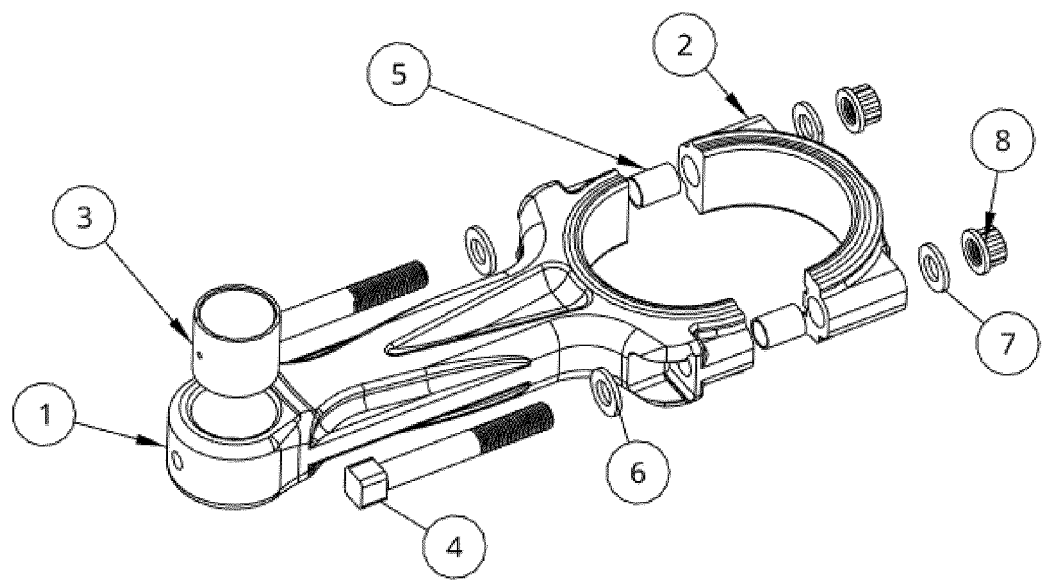
FIG. 1 is a perspective view, partially schematic of a connecting rod beam and cap (1 and 2) and designs in accordance with the present invention including: optional bushing (3) (in an alternative embodiment the inside of the pin bore is directly DLC coated), T-Bolts (4), alignment sleeves (5), washers (6 and 7), and nuts (8).
Figure 2:
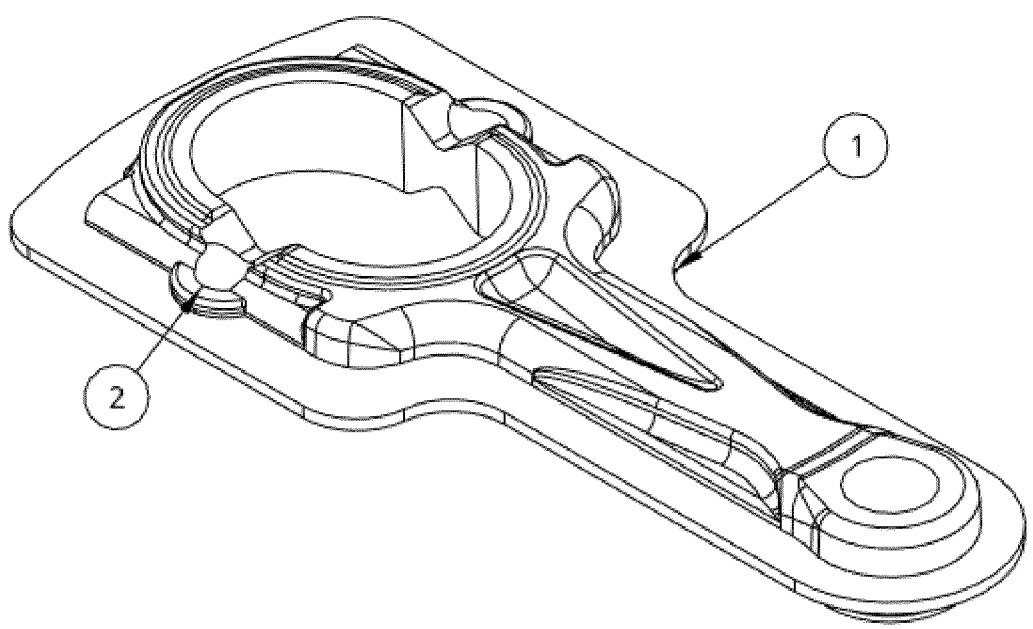
FIG. 2 is a view of the connecting rod blank that comes out of the mold, which can be machined into different sets of sizes and includes special features such as: the flange around the perimeter (1) and the pinch point (2).
Figure 3:
FIG. 3 is a top view of a carbon fiber composite connecting rod.

To make the blank a moldable design, the blank contains a pinch point and a flange. See FIG. 2. The flange present on the outer edge in the mold prevents formation of a knife-edge. Further the flange allows for a fillet on the top of the molded part, which severely reduces post-mold machine costs by creating the main contour of the rod in the molded blank. Without the flange the core piece of the mold would have to have a very thin edge that approaches zero thickness and which would not be feasible. The pinch point is needed to make the connecting rods producible. The pinch point creates an area between the rod beam and cap, which allows for a CNC milling machine to cut in between the beam and cap without cutting into the actual beam or cap, to separate the two parts.

Figure 7:
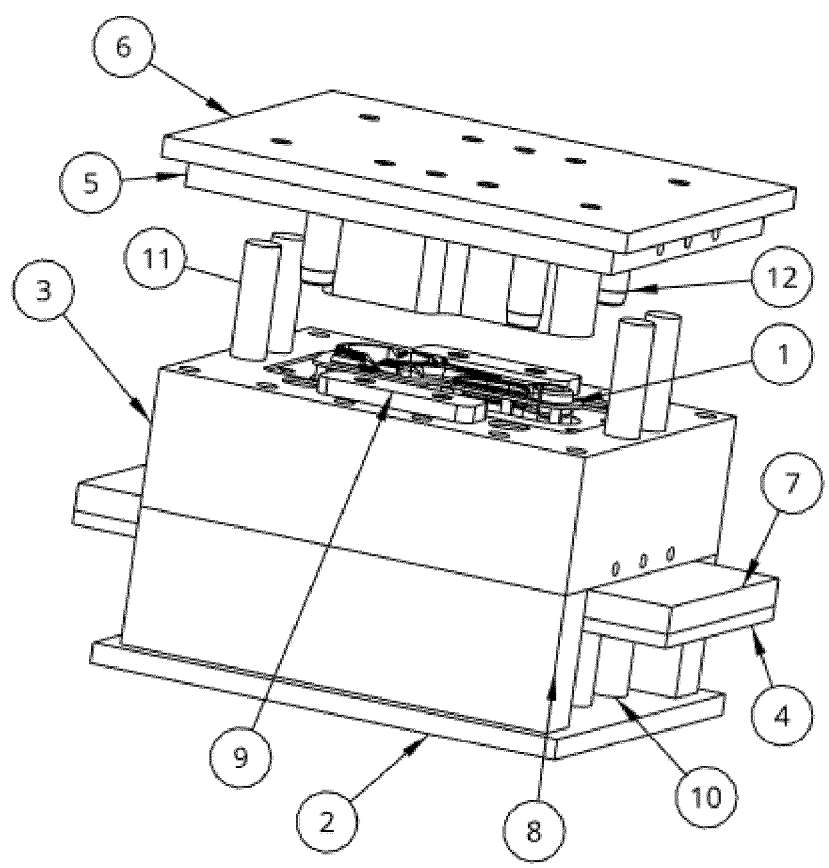
FIG. 7 is an isometric view of a full tooling assembly that is used to make the connecting rod blank (1). The full tooling assembly includes standard parts of a compression mold such as: a bottom base plate (2), a bottom die base (3), a bottom ejector plate (4), a core piece holder (5), a top base plate (6), a top ejector plate (7), side rails (8), stop pads (9), support pillars (10), return pins (11), and placeholder pillars (12).
Figure 8:
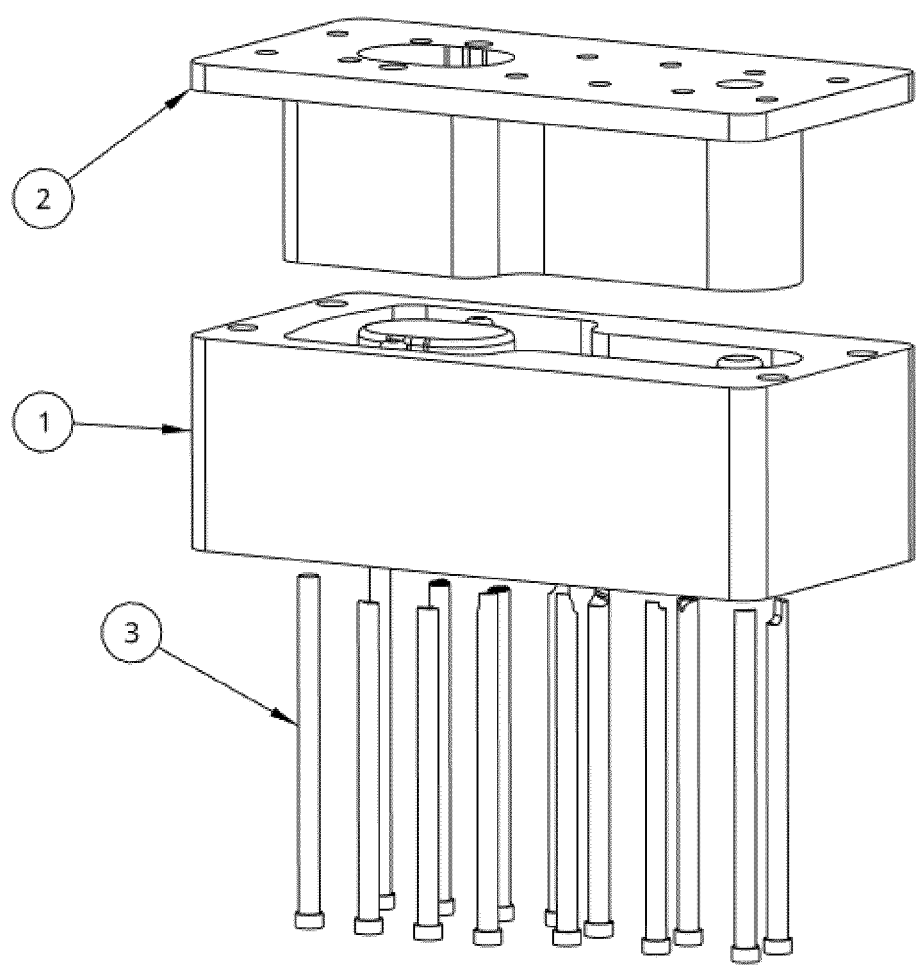
FIG. 8 is an isometric view of additional parts for a connecting rod mold tooling. These additional parts are used in conjunction with the full tooling assembly of FIG. 7 to make a specific mold for the connecting rod. The additional parts include a cavity piece (1), a core piece (2), and ejector pins (3).
Figure 9:
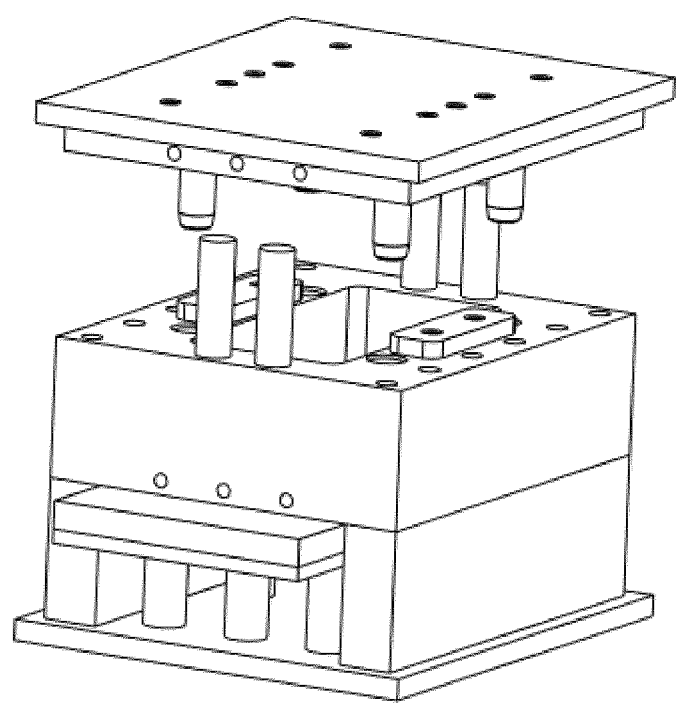
FIG. 9 is an isometric view of a base tooling which does not include additional parts from FIG. 8. The additional parts use the base tooling, so that any mold shape is used from the base tool.
Figure 10:
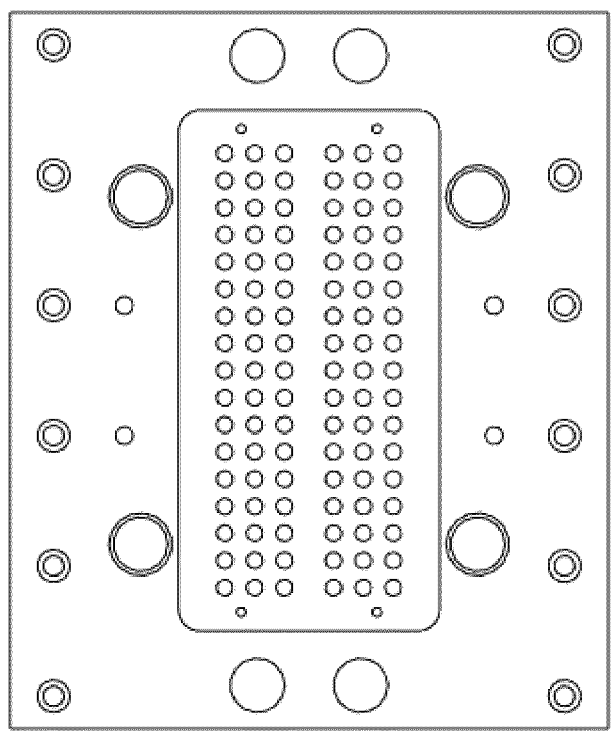
FIG. 10 is a top view of the bottom die base (3) shown in FIG. 7. The bottom die base has a cavity with a hole pattern in the center in which ejector pins are used. The hole pattern allows the bottom die base to be used to produce a connecting rod of any shape and any size, since multiple subsets of the ejector pin holes are chosen to be used for the application.

The present invention utilizes a new design for the tooling of the mold assembly. A tooling of the mold assembly is required because a plurality of types of different connecting rods are required for different types of engines, respectively. An economical way is needed to create versatility between producing different connecting rod blank designs. For example, it is not economical to produce different types of connecting rod designs because each connecting rod design would require a different tooling thereby resulting in large tooling costs. To address the tooling costs, the tooling assembly of the present invention includes a bottom die base (3) of FIG. 7 in which a plurality of different dies are placed to allow for versatility, instead of using a base that contains the cavity of the mold to be machined. Further, there are additional specific parts, which are included in the die, which are not required to be changed if the type of rod that is being produced by the tooling is changed. These additional specific parts are specific to the connecting rod blank being produced and include a cavity piece, a core piece, and ejector pins. See FIG. 8. However, the vast majority of parts are not required to be changed since these additional specific parts are made to fit the universal base around it. The bottom die base part that holds the cavity part of the additional specific die contains a pattern of ejector holes such that a variety of different connecting rod blanks are produced from the same universal base, since each set of additional specific parts only needs to use a subset of the holes available. See FIG. 10.

Figure 11:
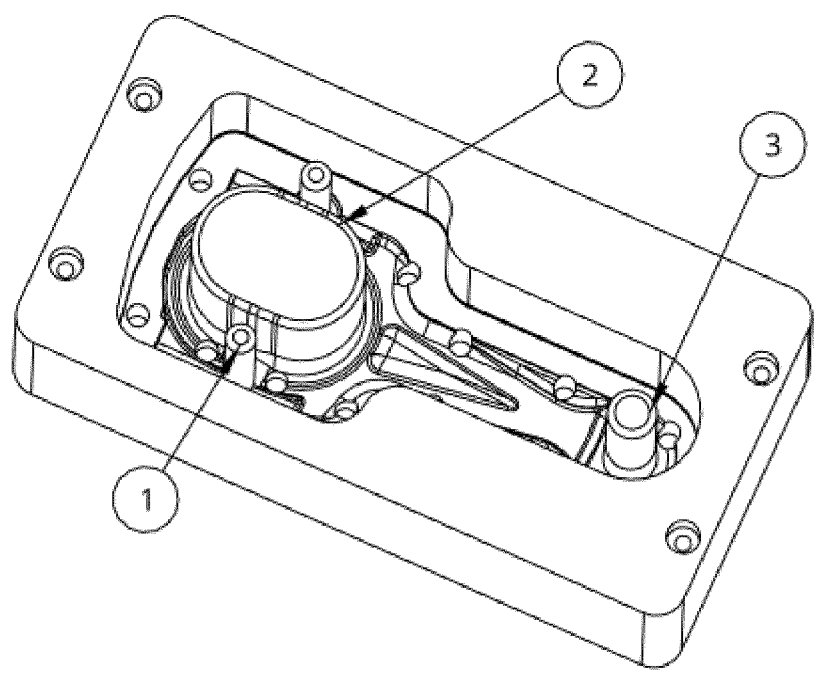
FIG. 11 is an isometric view of the cavity piece (1) shown in FIG. 8. The cavity piece is inserted into the bottom die base of FIG. 10 and uses a subset of the ejector pin holes to complete the tooling to mold a connecting rod blank. The parts of the cavity piece for molding the connecting rod include side protrusions (1), a big end boss protrusion (2), and a small end boss protrusion (3).

Further, the cavity piece contains a side protrusion, a big end boss protrusion, and a small end boss protrusion. See FIG. 11. The side protrusions are located next to the pinch point and they hold the unidirectional fiber skeleton. By creating a place for the fiber skeleton to sit between the beam and cap, continuous diagonal fibers are incorporated into the blank when molded, which gives the connecting rod blank greater compressive strength. In addition, the big end and small end boss protrusions are used to hold the unidirectional fiber skeleton in place. These protrusions facilitate wrapping of the unidirectional fiber right around the big end and small end bosses thereby creating a stronger localized strength at the big end and small end bores. In addition, the protrusions reduce waste material by allowing for the big end and small end bores to be present after the blank comes out of the mold, such that post-mold machining only requires the bores to be finished off to final tolerance.

Figure 12:
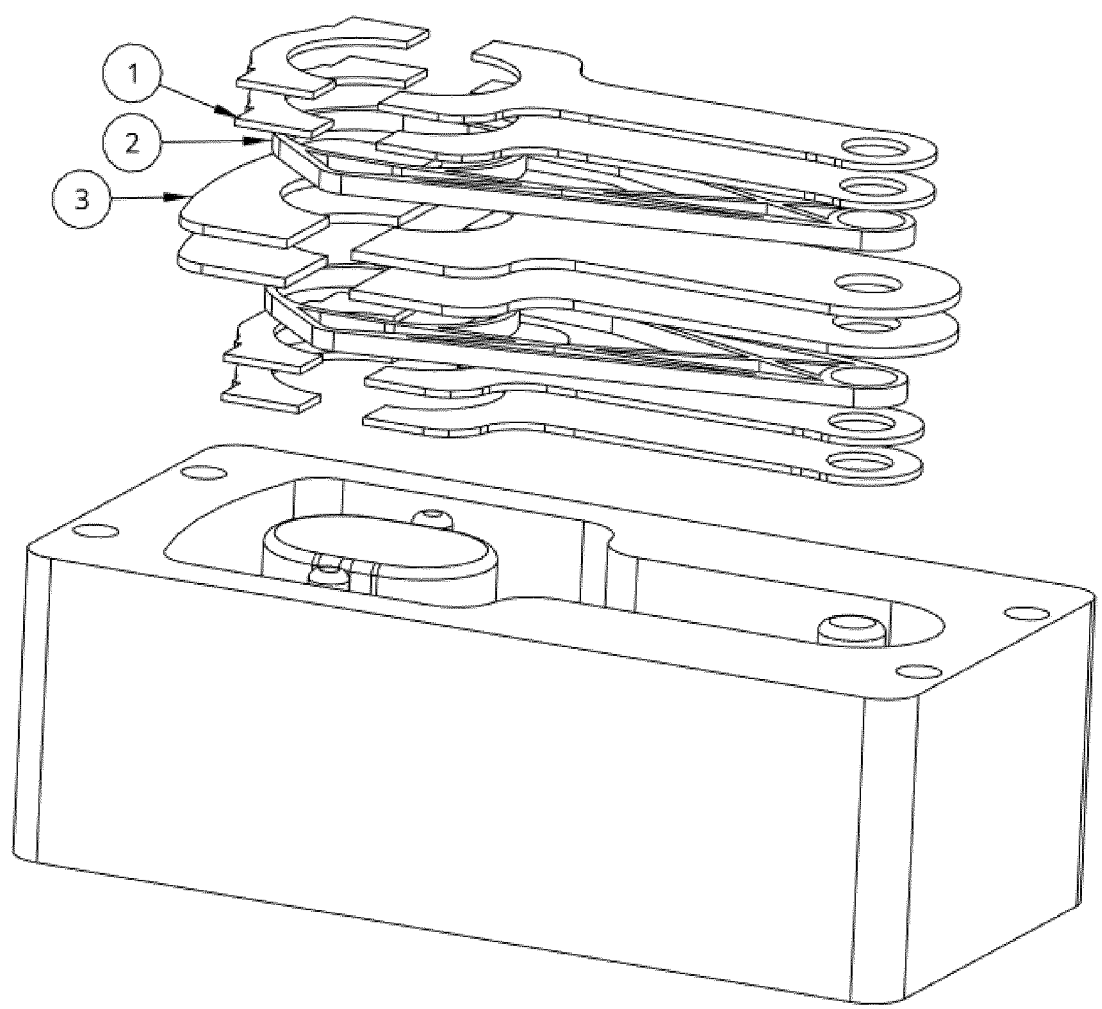
FIG. 12 is an isometric view of the connecting rod processing which include pieces that are compression molded together to make the connecting rod blank. The pieces include smaller sheet molding compound (SMC) plies (1) and larger SMC plies (3). The SMC plies in the center are larger than the smaller SMC plies and hence occupy the flange around the blank. In an alternative embodiment an optional unidirectional fiber skeleton (2) is co-molded with the SMC to add strength to the connecting rod.

In production of the connecting rod blank, there are layers of SMC (Sheet matrix composite) sheets with an optional unidirectional fiber skeleton to improve strength. The SMC is the carbon fiber reinforced epoxy molding compound composite. Larger SMC plies are placed in the center to fill up the flange on the edge of the entire part. Further, an optional unidirectional fiber skeleton is added to both sides to increase tensile and compressive strength of the part. Smaller SMC plies are added on the top and bottom to obtain a nearer to net shape during molding, such that the molding process is smoother. See FIG. 12.

Figure 13:
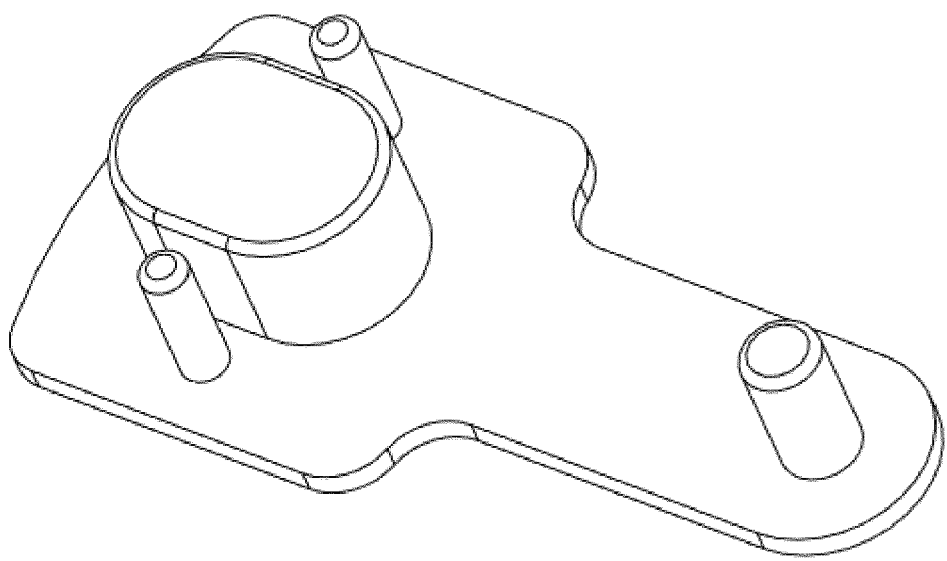
FIG. 13 is an isometric view of an apparatus around which the optional unidirectional fiber skeleton (2) from FIG. 12 is wrapped.
Figure 14:
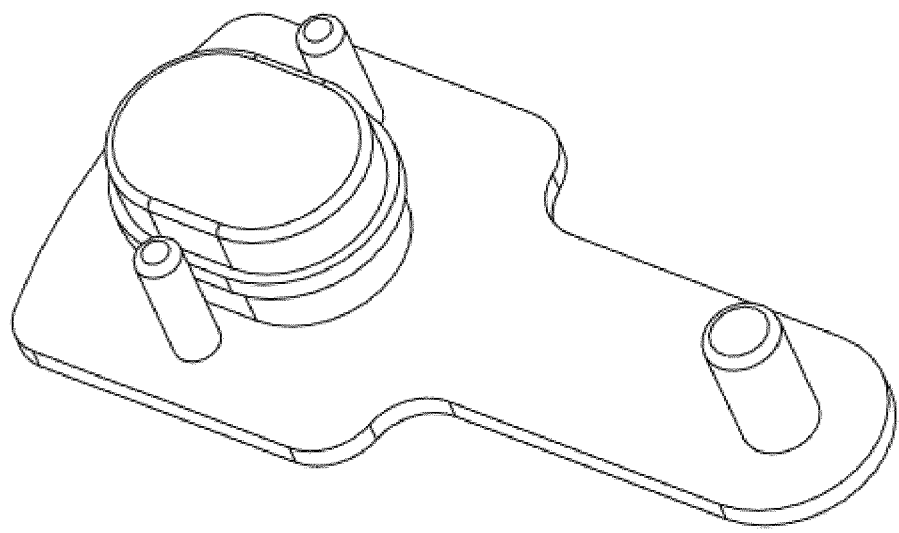
FIG. 14 is an isometric view of the apparatus from FIG. 13 in which the first step done of wrapping the unidirectional fiber skeleton is completed.
Figure 15:
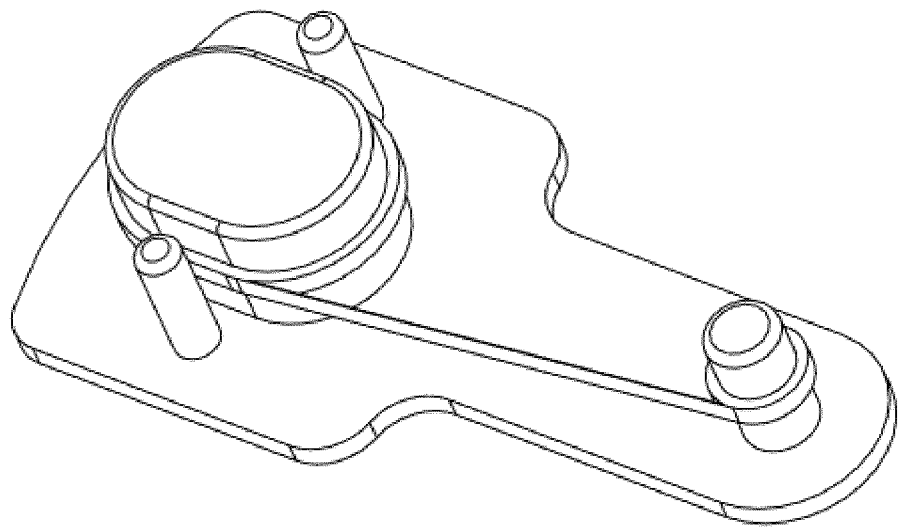
FIG. 15 is an isometric view of the apparatus from FIG. 14 in which the second step of wrapping the unidirectional fiber skeleton is completed.
Figure 16:
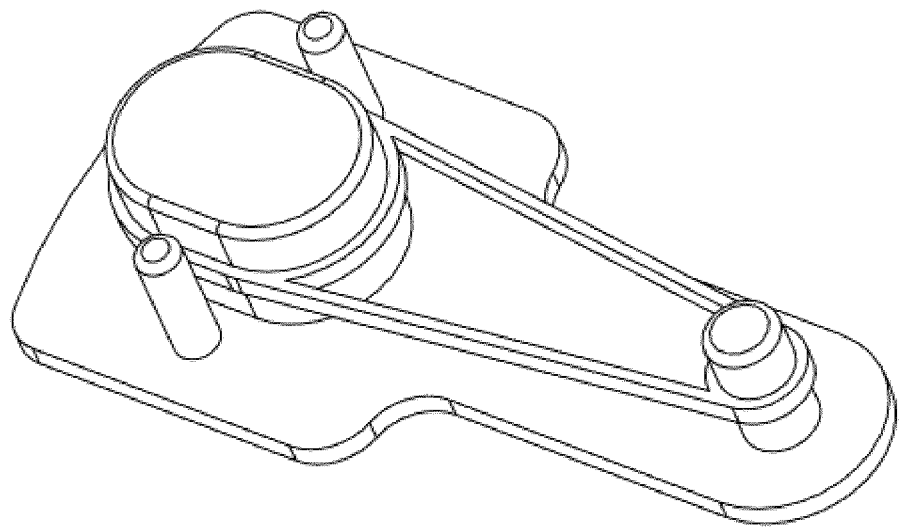
FIG. 16 is an isometric view of the apparatus from FIG. 15 in which the third step of wrapping the unidirectional fiber skeleton is completed.
Figure 17:
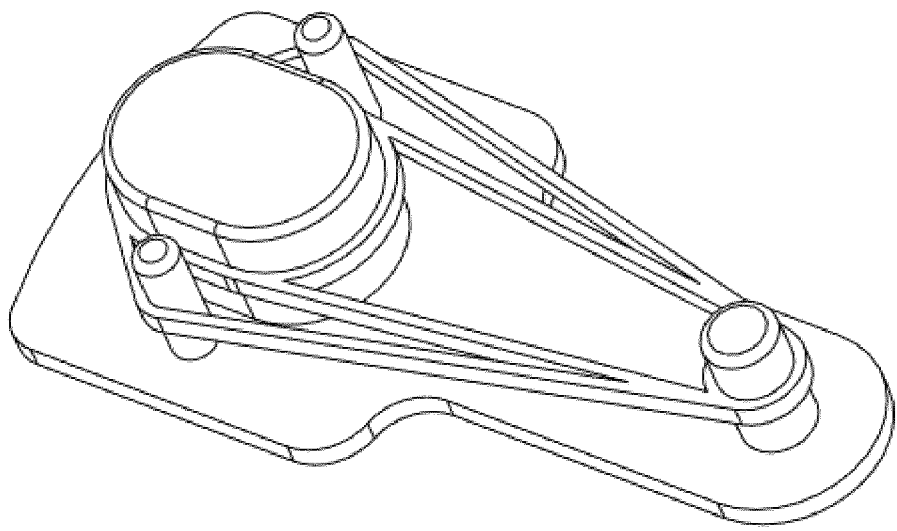
FIG. 17 is an isometric view of the apparatus from FIG. 16 in which the fourth step of wrapping the unidirectional fiber skeleton is completed.
Figure 18:
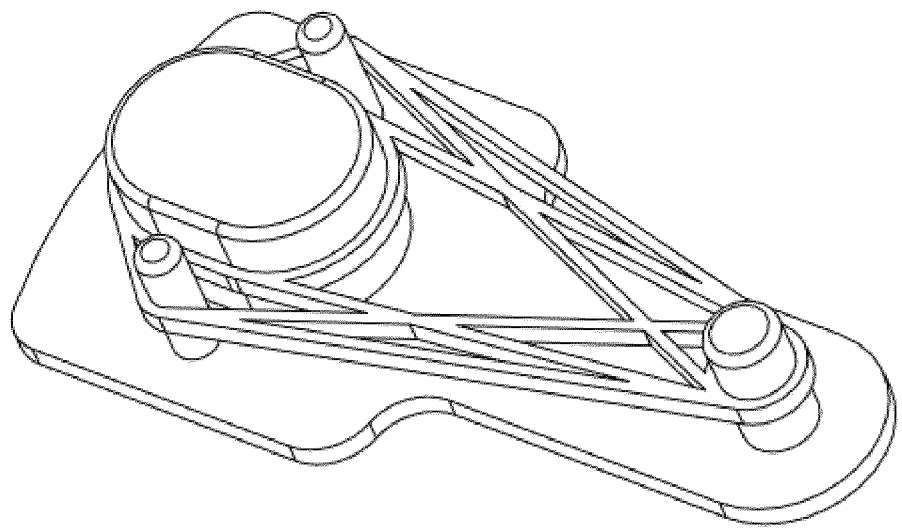
FIG. 18 is an isometric view of the apparatus from FIG. 17 in which the fifth step of wrapping the unidirectional fiber skeleton is completed.

An apparatus is used to wrap the unidirectional fiber skeleton thereby co-molding the fiber skeleton with the SMC plies. The apparatus contains protrusions that are identical to the protrusions of the cavity piece such as a big end protrusion, a small end protrusion, and side protrusions. See FIG. 13. These protrusions match the contours of the cavity piece, such that the unidirectional fiber skeleton aligns and fits into the cavity during the molding process. A carbon fiber towpreg which is a continuous unidirectional carbon fiber prepreg that has a high filament count is used to wrap the fiber skeleton. The towpreg is wrapped around the big end boss protrusion. See FIG. 14. The towpreg is then transferred to the pin end of the apparatus and is wrapped around the small end boss protrusion. See FIG. 15. The towpreg is then wrapped around the small end and big end bosses. See FIG. 16. After wrapping around the small end and big end bosses, the towpreg is wrapped around the side protrusions, the small end boss and big end boss. See FIG. 17. The towpreg is finally wrapped around the side protrusions, the small end protrusion, and big end protrusion in a crisscross pattern. See FIG. 18. This last wrap gives the most compressive strength to the connecting rod by creating diagonally oriented continuous fibers. After wrapping, the fiber skeleton is taken off the apparatus to be co-molded with the SMC for extra strength, as in the aforementioned molding process.

Once released from the mold, the carbon fiber connecting rod blank is machined into a final design. A CNC milling machine or similar device is utilized to machine the larger connecting rod blank into the final connecting rod design.

This invention is for the treatment of composite material(s) specifically compression molded or SMC. In the present invention, the carbon fiber reinforced epoxy molding compound composite is a sheet molding compound. Sheet molding compound (SMC) or sheet molding composite is a ready to mold carbon-fiber reinforced epoxy molding material primarily used in compression molding. The sheet is provided in rolls weighing up to 1000 kg. Alternatively, the resin and related materials are mixed on site if a producer wants greater control over the chemistry and filler. SMC is both a process and reinforced composite material(s).

The final connecting rod design is then subjected to sodium silicate impregnation treatment which is introduces sodium silicate into the open pores of the substrate composite material to eliminate or significantly reduce the undesirable hygroscopic effects of porosity.

In embodiments of the invention described herein, the compression molded SMC parts are treated with a solution of sodium silicate containing both potassium dichromate, and chromic acid(s). The solution is typically applied in a vacuum autoclave. The near net SMC components are placed in a vacuum autoclave, the autoclave pressure is applied, the parts are removed once the pressure is released, and dried in a low temperature oven.

Sodium silicate solution contains a weight ratio of silica to sodium oxide dissolved in water. The sodium silicate has a weight ratio of 3.22 ($SiO_2$:$Na_2O$), which is from about 28.7% silica ($SiO_2$) to about 8.9% sodium oxide ($Na_2O$), and results into a solution that is about 37.5% sodium silicate by weight in water. This specific gravity is maintained by addition of water intermittently as the solution tends to evaporate as it is heated to operating temperatures.

The solution fills the porosity of the compression molded parts and on the removal of the parts the solution is retained in the pores. The compression molded parts are then thoroughly washed in cold water and the solution is retained in the pores of the substrate composite(s).

The SMC components are placed in a vacuum autoclave to remove the air from the pores in the SMC by vacuum for a fixed period of time, for example about 20 minutes at 26"Hg. A heated sodium silicate solution is introduced into the vacuum autoclave and covers the parts when the pressure goes from negative to positive. The standard working temperature is generally at least about 95° C. to at least about 100° C. and the standard working pressure is from at least about 60 lbs. to at least about 85 lbs. per square inch. The pressure is maintained for at least about 8-hours, then released and the parts are subsequently removed from the autoclave and solution, then thoroughly washed in cold water. The components are then placed into a low temperature oven at about 100° C. for at least about one hour.

It is submitted that the instant invention has been shown and described in what is the most practical and preferred method steps. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function, steps, and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of designing and producing a composite connecting rod having a plurality of connecting rod designs, the method comprising:
   combining the plurality of the connecting rod designs to obtain a single connecting rod blank design;
   forming a tooling cavity mold of the connecting rod blank design and compression molding a connecting rod blank using the tooling mold; wherein the compression molding the connecting rod blank comprises, heating the composite material, placing the composite material into the mold, compressing material in the mold using a press which further comprises laying a unidirectional fiber skeleton, and removing the material after cooling; and
   machining the connecting rod blank into at least one of the connecting rod designs thereby obtaining the composite connecting rod.

2. The method of claim 1 the composite comprises a carbon fiber reinforced epoxy molding compound composite material.

3. The method of claim 1, the connecting rod designs further comprise determining diameter, length, and beam type of the connecting rod designs prior to combining the connecting rod designs.

4. The method of claim 1 further comprises preparing a complete tooling assembly prior to combining the connecting rod designs, which further comprises:
   making a universal base tool for designing and producing one or more connecting rod blank;
   designing specific parts comprising a cavity piece, core piece, and at least one ejector pin to mold the connecting rod blank;
   manufacturing the specific parts; and
   attaching the specific parts to the universal base tool to obtain the complete tooling assembly.

5. The method of claim 1, the compression molding, blank further comprises at least one of:
   laying at least one first sheet matrix composite plie on the tooling cavity;
   laying the unidirectional fiber skeleton on a first plie;
   laying at least one second sheet matrix composite plie on the unidirectional fiber skeleton;
   compression molding the first plie, the unidirectional fiber skeleton, and a second plie in the tooling assembly to obtain the connecting rod blank.

6. The method of claim 1, the connecting rod blank comprises a flange located around a perimeter of the blank, a pinch point, a bolt register, and a bearing tang.

7. The method of claim 1, further comprising after the machining, impregnating the connecting rod blank with impregnating liquid containing sodium silicate.

8. The method of claim 7, the impregnating further comprises:
   placing the connecting rod blank into an autoclave;
   applying vacuum to the autoclave and subjecting the connecting rod blank to negative autoclave pressure;
   heating the impregnating liquid containing the sodium silicate impregnating solution;
   introducing the heated impregnating solution into the autoclave;

submerging the connecting rod blank in the heated impregnating solution and increasing the autoclave pressure from negative pressure to positive pressure;

maintaining the positive pressure in the autoclave removing the connecting rod blank from the autoclave and washing the connecting rod blank in cold water; and drying the connecting rod blank.

9. The method of claim 8, the drying the connecting rod blank further comprises drying the blank in an oven for at least 10 minutes.

* * * * *